(12) United States Patent
Shin et al.

(10) Patent No.: US 8,349,752 B2
(45) Date of Patent: Jan. 8, 2013

(54) PLATE BRICK AND PRODUCTION METHOD THEREFOR

(75) Inventors: Yasuaki Shin, Fukuoka (JP); Kazuo Ito, Aichi (JP); Michihiko Ichimaru, Aichi (JP); Tamotsu Wakita, Fukuoka (JP); Masamichi Asai, Fukuoka (JP)

(73) Assignee: Krosakiharima Corporation, Fukuoka (JP)

( * ) Notice: Subject to any disclaimer, the term of this patent is extended or adjusted under 35 U.S.C. 154(b) by 41 days.

(21) Appl. No.: 12/921,009

(22) PCT Filed: Mar. 25, 2009

(86) PCT No.: PCT/JP2009/055991
§ 371 (c)(1),
(2), (4) Date: Nov. 17, 2010

(87) PCT Pub. No.: WO2009/119683
PCT Pub. Date: Oct. 1, 2009

(65) Prior Publication Data
US 2011/0077340 A1    Mar. 31, 2011

(30) Foreign Application Priority Data

Mar. 25, 2008 (JP) ................. 2008-077599

(51) Int. Cl.
*B22D 41/28* (2006.01)
*B22D 41/30* (2006.01)
*B22D 41/32* (2006.01)

(52) U.S. Cl. .......... 501/105; 501/94; 523/139; 523/145; 521/919; 524/437

(58) Field of Classification Search ............ 501/94, 501/105; 521/919; 523/139, 145; 524/437; B22D 41/28, 41/30, 41/32
See application file for complete search history.

(56) References Cited

U.S. PATENT DOCUMENTS 4,280,844 A    7/1981 Shikano et al.
4,954,535 A    9/1990 Haranda et al.

FOREIGN PATENT DOCUMENTS

| CN | 1569364 A | * | 1/2005 |
|---|---|---|---|
| JP | 55-065348 | | 5/1980 |
| JP | 60-029664 B | | 7/1985 |
| JP | 60200857 A | | 10/1985 |
| JP | 1103952 A | | 4/1989 |
| JP | 1313358 A | | 12/1989 |
| JP | 11199313 A | * | 7/1999 |
| JP | 11199328 A | | 7/1999 |
| JP | 2000094121 A | | 4/2000 |

OTHER PUBLICATIONS

Machine translated English equivalent of JP 11-199313 (Jul. 1999, 10 pages).*
Machine translated English equivalent of CN 1569364 (Jan. 2005, 5 pages).*
CAPlus Abstract of CN 1569364 (AN 2005:1230895, Jan. 2005, 1 page).*
Google Translation of apparent porosity and compressive strength (2011, 2 pages).*
English translation of International Search Report published Oct. 1, 2009 for PCT/JP2009/05591 filed Mar. 25, 2009.
International Search Report in Japanese published Oct. 1, 2009 for PCT/JP2009/05591 filed Mar. 25, 2009.

* cited by examiner

*Primary Examiner* — Ling Choi
*Assistant Examiner* — Brieann R Fink
(74) *Attorney, Agent, or Firm* — Marty Fleit; Paul Bianco; Fleit Gibbons Gutman Bongini Bianco PL

(57) ABSTRACT

The present invention provides a plate brick having a low amount of generation of smoke and a gas with a pungent odor during use, and exhibiting high durability. A plate brick of the present invention is obtained by: adding an organic binder to a refractory raw material mixture containing 0.5 to 20 mass % of aluminum and/or aluminum alloy; kneading the mixture with the organic binder; forming the kneaded mixture into a shaped body; and subjecting the shaped body to a heat treatment at a temperature of 400 to 1000° C., wherein the plate brick is obtained without being impregnated with a carbon-containing liquid material comprising tar or pitch, after the heat treatment. The plate brick has a compressive strength of 180 MPa or more, and a weight-increasing rate of 1% or less as measured in a hydration test using an autoclave.

20 Claims, No Drawings

PLATE BRICK AND PRODUCTION METHOD THEREFOR

TECHNICAL FIELD

The present invention relates to a plate brick for use in a sliding nozzle device and other devices to control a flow rate of molten metal, in iron and steel industries, etc., and a production method for the plate brick.

BACKGROUND ART

A refractory plate brick is used in a sliding nozzle device for controlling a flow rate of molten steel. The plate brick is commonly made using an alumina-carbon based material, and classified broadly into an unburned product and a burned product according to a production method therefor. Generally, the unburned product is produced by, after a shaping process, performing a heat treatment at a temperature of 100 to 300° C. The burned product is produced by performing a burning process at a high temperature of 1000° C. or more, and, after the burning process, performing an impregnation treatment with pitch, tar or the like.

However, the above plate bricks have a problem that they generate smoke and a pungent odor during use. This is because the unburned product generates a decomposition gas of a phenol resin as a binder, and the burned product generates a decomposition gas of tar or the like as an impregnant.

Therefore, a so-called soft-burned product to be produced by performing a heat treatment at a temperature of 400 to 1000° C., i.e., a temperature intermediate between the above temperatures, was studied as a plate brick with less generation of the decomposition gas.

For example, the following Patent Document 1 discloses a production method which comprises kneading and forming a mixture of a refractory raw material, a phenol-based resin and an aluminum powder consisting of atomized spherical particles to obtain a shaped body, and then subjecting the shaped body to a heating treatment at a temperature of 550 to 650° C. The Patent Document 1 describes as follows. If the heating treatment temperature is less than 550° C., oxidation resistance of the phenol-based resin becomes inferior, and a decomposition gas of the phenol-based resin is generated to cause odor during use. If the heating treatment temperature is greater than 650° C., aluminum carbide will be formed. If aluminum carbide is formed, it easily reacts with water under normal temperature and normal pressure to form aluminum hydroxide, which involves a volume expansion and an increase in weight. Thus, it is highly likely that an obtained plate brick will crumble during storage.

The following Patent Document 2 discloses a technique of adding a phenol resin to a mixture consisting of 90 to 99.5 weight % of aggregate of a refractory inorganic material, and 0.5 to 10 weight % of aluminum or aluminum alloy fiber, and subjecting the mixture to a heat treatment at 700° C., 850° C. or 1000° C. The Patent Document 2 described as follows. Based on performing the heat treatment at a temperature equal to or greater than a melting point of the aluminum or aluminum alloy (as for aluminum, 660° C.), aluminum can be infiltrated between grains of a peripheral microstructure to dramatically improve strength of a refractory product and significantly enhance spalling resistance of the refractory product. If the heat treatment temperature is greater than 1000° C., desired characteristics as a fiber cannot be maintained, so that a difference in characteristics between a fiber and a powder will be lost. Moreover, along with progress of the aluminum infiltration, a void occurs in an area where the fiber has existed, so that it is rather likely that corrosion/erosion resistance will deteriorate.

The following Patent Document 3 discloses a production method which comprises: preparing a refractory inorganic raw material, a carbon-based raw material and a metal-based raw material to allow the raw materials to form a continuous particle size distribution having a particle size of 0.1 to 4000 μm; adding a phenol resin to the raw materials; and burning the mixture in a non-oxidizing atmosphere at a temperature of 800 to 1500° C., wherein no impregnation treatment is performed. The Patent Document 3 also discloses a refractory product subjected to a burning process at 850° C. and having an apparent porosity of 5.0%, as one example.

[Patent Document 1] JP 2000-94121A
[Patent Document 2] JP 1-313358A
[Patent Document 3] JP 11-199328A

DISCLOSURE OF THE INVENTION

Problem to be Solved by the Invention

In the production method disclosed in the Patent Document 1, an obtained plate brick is significantly inferior in durability to the conventional impregnated burned product, although the decomposition gas generation during use is reduced. One reason is that the phenol resin as a binding microstructure is decomposed and vaporized to form a porous microstructure, and thereby the plate brick is insufficient in strength. Another reason is that a strength development effect based on melting and reaction of aluminum is insufficient because the upper limit of the heat treatment temperature is set to a relatively low value of 650° C.

On the other hand, in cases where the heat treatment is performed at a temperature of 660° C. as the melting point of aluminum to 1000° C., as described in the Patent Documents 2 and 3, strength of an obtained plate brick is improved based on melting and reaction of aluminum, as compared with the Patent Document 1. However, durability of the plate brick largely varies depending on a value of the heat treatment temperature, and a plate brick having sufficient durability cannot be always obtained.

It is therefore an object of the present invention to provide a plate brick having a low amount of generation of smoke and a gas with a pungent odor during use, and exhibiting high durability, and a production method for the plate brick.

Means for Solving the Problem

In cases where a temperature for a heat treatment during production of a plate brick is in the range of 400 to 1000° C., melting of aluminum, formation of aluminum carbide, and formation of other aluminum compounds, occur during the heat treatment. Thus, characteristics of the plate brick after the heat treatment largely vary depending on a value of the heat treatment temperature. Consequently, in a conventional plate brick production method, plate bricks are obtained while becoming different from each other in terms of durability depending on conditions for the heat treatment.

Therefore, the inventor carried out a practical test for a plurality of plate bricks subjected to a heat treatment at various temperatures ranging from 400 to 1000° C., to check generation of smoke/pungent odor, and durability. As a result, the inventor has obtained knowledge that a plate brick having specific characteristics is useful as a plate brick having a low amount of generation of smoke and a gas with a pungent odor, and exhibiting high durability, as compared with conventional plate bricks.

Specifically, the present invention provides a plate brick obtained by: adding an organic binder to a refractory raw material mixture containing 0.5 to 20 mass % of aluminum and/or aluminum alloy; kneading the mixture with the organic binder; forming the kneaded mixture into a shaped body; and subjecting the shaped body to a heat treatment at a temperature of 400 to 1000° C., wherein the plate brick is obtained without being impregnated with a carbon-containing liquid material comprising tar or pitch, after the heat treatment. The plate brick has a compressive strength of 180 MPa or more, and a weight-increasing rate of 1% or less as measured in a hydration test using an autoclave.

If the temperature for the heat treatment during production of a plate brick is greater than 400° C., the organic binder such as a phenol resin is decomposed and vaporized during the heat treatment, so that a microstructure of an obtained plate brick becomes excessively porous and thereby the plate brick has low strength. Consequently, durability of the plate brick deteriorates. On the other hand, when the heat treatment temperature is increased up to a certain level of temperature or more, melting and reaction of the aluminum and/or aluminum alloy occur, and thereby the strength is improved. Therefore, as a prerequisite to allowing a plate brick to have sufficient durability, it is necessary for the plate brick to have a compressive strength of 180 MPa or more. If the compressive strength is less than 180 MPa, the strength becomes insufficient, and thereby the durability becomes insufficient due to cracking, abrasion/wear, etc.

In the plate brick of the present invention, the refractory raw material mixture containing 0.5 to 20 mass % of aluminum and/or aluminum alloy is used, and the heat treatment is performed at a temperature of 400 to 1000° C. Thus, depending on production conditions, for example, when the heat treatment temperature is relatively high, the reaction of aluminum is likely to be excessively promoted to cause excessive formation of aluminum carbide. If aluminum carbide is excessively formed, hydration (slaking) resistance of an obtained plate brick will deteriorate. If the hydration resistance is insufficient, cracks will occur in a microstructure of the plate brick during storage to cause deterioration in the strength and therefore deterioration in the durability. Particularly in a hot and humid environment, hydration (slaking) occurs even in storage for a short period of time. Specifically, if a weight-increasing rate as measured in a hydration test using an autoclave is greater than 1%, hydration is likely to occur during storage of a plate brick.

In the plate brick of the present invention, the heat treatment temperature during the production may be set in the range of 400 to 800° C. This is because, if the heat treatment temperature is greater than 800° C., aluminum carbide is more likely to be excessively formed.

The organic binder to be used for the plate brick of the present invention may comprise a combination of a phenol resin and a silicon (silicone) resin. The use of the combination of a phenol resin and a silicon (silicone) resin as the organic binder for the plate brick to be subjected to the heat treatment at a temperature of 400 to 1000° C. has an advantage of being able to enhance the resistance to hydration due to aluminum carbide. In addition, this makes it possible to densify a microstructure of the plate brick to allow the plate brick to have high strength.

In the plate brick of the present invention using the organic binder, if the heat treatment temperature is set to an excessively low value, gas originating from the organic binder will be generated in the plate brick. Preferably, the plate brick of the present invention generates gas in an amount of 0.5 to 8 cc/1 g as measured at 1000° C. As long as the gas generation amount is 8 cc/1 g or less, smoke to be generated during use of the plate brick in an actual job site is reduced, and an abnormal odor causing a person to have discomfort can be almost eliminated. If the gas generation amount is less than 0.5 cc/1 g, formation of a gas film in a surface of a plate brick during use is likely to become insufficient to cause deterioration in an effect of reducing chemical erosion by molten metal, resulting in insufficiency of the durability.

In the plate brick of the present invention using the organic binder, a porosity thereof is much more increased as the heat treatment temperature becomes higher. If the porosity is excessively high, a slag component will be infiltrated into pores in a large amount to cause deterioration in corrosion/erosion resistance. Therefore, the durability is much more improved as an apparent porosity becomes lower. Thus, the apparent porosity is preferably in the range of 2 to 10%, more preferably in the range of 4 to 8%. If the apparent porosity is less than 2%, a microstructure of an obtained plate brick is likely to be excessively densified to cause insufficiency of thermal shock resistance. If the apparent porosity is greater than 10%, the microstructure is likely to become excessively porous to cause insufficiency of corrosion/erosion resistance.

Preferably, the plate brick of the present invention contains aluminum in an amount of 0.5 to 3.5 mass %. In the plate brick having residual aluminum after the heat treatment, the residual aluminum selectively migrates to an area having a large heat load during actual use so as to maintain denseness through self-impregnation to effectively improve the durability. If the content rate is less than 0.5 mass %, the durability has a tendency to deteriorate. If the content rate is greater than 3.5 mass %, residual aluminum will be transformed into aluminum carbide and alumina, and thereby a microstructure of an obtained plate brick will be excessively densified to cause a tendency of the durability to deteriorate.

As a result of researches of the inventor, it has also been found that a rate of change of aluminum in a plate brick before and after a heat treatment has a great impact on durability of the plate brick and generation of smoke during use. Further, it has been found that a plate brick satisfying the above characteristics can be produced by the following production method.

The method comprises: adding an organic binder to a refractory raw material mixture containing 75 to 97 mass % of alumina-based raw material, 0.5 to 20 mass % of aluminum and/or aluminum alloy, and 0.1 to 15 mass % of one or more selected from the group consisting of silicon, clay, silicon carbide and boron carbide; kneading the mixture with the organic binder; forming the kneaded mixture into a shaped body; and subjecting the shaped body to a heat treatment, wherein the heat treatment is performed under conditions allowing a ratio of a content rate of aluminum in the plate brick after the heat treatment to a content rate of aluminum in the refractory raw material mixture to fall within the range of 20 to 60%, and the plate brick is produced without being impregnated with a carbon-containing liquid material comprising tar or pitch, after the heat treatment.

In the present invention, aluminum and an aluminum alloy is mixed in order to improve durability of the plate brick, as mentioned above, more specifically in order to form a binding microstructure through a reaction with the remaining refractory raw materials, atmosphere gas and/or the organic binder to improve strength of the plate brick, and prevent oxidation of the plate brick during use. If the mixed amount of the aluminum and aluminum alloy is less than 0.5 mass %, the above effects become insufficient. If the mixed amount is greater than 20 mass %, thermal shock resistance becomes deteriorated. Preferably, the aluminum alloy is one or more selected from the group consisting of an Al—Mg alloy, an Al—Si alloy and an Al—Mg—Si alloy, and a content rate of Al in the aluminum alloy is 30 mass % or more, in view of the strength-improving effect.

In the production method of the present invention, the heat treatment is performed under conditions allowing a ratio (($B/A$)×100)) of a content rate (B mass %) of aluminum in the plate brick after the heat treatment to a content rate (A mass %) of aluminum in the refractory raw material mixture to fall within the range of 20 to 60%. If the heat treatment is performed under conditions causing the ratio to become less than 20%, wear will be increased to cause deterioration in the durability. If the heat treatment is performed under conditions causing the ratio to become greater than 60%, the reaction of the aluminum and/or aluminum alloy becomes insufficient to cause insufficiency of the strength, and a surface roughness of an obtained plate brick becomes larger to cause insufficiency of the durability and an increase in generation of gas during use. The content rate of aluminum in the refractory raw material mixture means a content rate of aluminum (Al) as a chemical component in aluminum and an aluminum alloy to be used as a refractory raw material. In cases where aluminum and an aluminum alloy are used in combination, the content rate of aluminum is a total content rate of respective Al components of the aluminum and aluminum alloy. Further, the content rate of aluminum in the plate brick means a content rate of Al as a metal contained in the plate brick.

In the production method of the present invention, if the mixed amount of one or more selected from the group consisting of silicon, clay, silicon carbide and boron carbide is less than 0.1 mass %, hydration resistance becomes insufficient. If the mixed amount is greater than 15 mass %, excessive sintering will occur during use to cause deterioration in spalling resistance.

In the production method of the present invention, the refractory raw material mixture may contain, as the alumina-based raw material, 10 to 40 mass % of high-performance zirconia-mullite obtained through a fusion process, wherein the zirconia-mullite comprises crystalline zirconia and mullite as primary components, with the remainder being corundum and/or a matrix glass, and wherein the crystalline zirconia includes a eutectic zirconia crystal having a grain size of 1.0 μm or less, and the matrix glass is contained in an amount of 5 mass % or less. The high-performance zirconia-mullite has a thermal expansion coefficient less than that of conventional zirconia-mullite, so that a plate brick having extremely excellent durability can be obtained.

Effect of the Invention

The plate brick of the present invention obtained without being impregnated with tar, pitch or the like can exhibit durability equal to that of a conventional plate brick impregnated with tar or pitch.

In addition, a harmful substance derived from the organic binder is mostly vaporized through the heat treatment, and an impregnation treatment with tar, pitch or the like is not performed, which makes it possible to significantly reduce generation of a harmful gas during use to suppress adverse effects on a human body and natural environments.

In the plate brick production method of the present invention, based on controlling the content rate of aluminum after the heat treatment, a plate brick with less generation of smoke and a gas having a pungent odor during use and with excellent durability can be produced more reliably and stably.

Further, the high-performance zirconia-mullite may be mixed in the refractory raw material mixture. In this case, the thermal shock resistance is further improved, so that a plate brick with enhanced durability can be produced.

BEST MODE FOR CARRYING OUT THE INVENTION

A plate brick of the present invention is produced while taking into account production conditions, by a production method which comprises: adding an organic binder to a refractory raw material mixture containing 0.5 to 20 mass % of aluminum and/or aluminum alloy; kneading the mixture with the organic binder; forming the kneaded mixture into a shaped body; and subjecting the shaped body to a heat treatment at a temperature of 400 to 1000° C., wherein the plate brick is produced without being impregnated with tar, pitch or the like.

Specifically, the plate brick of the present invention can be obtained by the following production method of the present invention.

In the production method of the present invention, aluminum and/or an aluminum alloy are mixed in a refractory raw material mixture in an amount of 0.5 to 20 mass %. When aluminum and an aluminum alloy is combined with an organic binder, it will produce a higher strength-improving effect after a heat treatment at a temperature of 400 to 1000° C., as compared with other metals. The aluminum and aluminum alloy may be any type of aluminum and aluminum alloy commonly used as a raw material for refractory products, and may be used in any suitable form, such as flaky form, atomized form or fibrous form. The aluminum alloy may be one or more selected from the group consisting of an Al—Mg alloy, an Al—Si alloy and an Al—Mg—Si alloy. More preferably, in view of the strength-improving effect, the aluminum alloy contains aluminum in an amount of 30 mass % or more. As with aluminum, each of the above aluminum alloys is capable of producing an oxidation-preventing effect during use, and reacting with the organic binder, atmosphere gas or other refractory raw material at a temperature of 400 to 1000° C. during the production to produce the strength-improving effect.

The mixed amount of the aluminum and/or aluminum alloy in the refractory raw material mixture is set in the range of 0.5 to 20 mass %. More preferably, the mixed amount of the aluminum when used by itself, and the mixed amount of the aluminum alloy when used by itself, are set in the range of 0.5 to 10 mass % and the range of 0.5 to 20 mass %, respectively, and the total mixed amount of the aluminum and aluminum alloy when used in combination is set in the range of 1 to 20 mass %.

In addition to the aluminum and/or aluminum alloy, any material commonly used as a raw material for refractory products may be mixed in the refractory raw material mixture without problems. For example, it may include an alumina-based raw material, a metal, a carbon-based raw material, clay, silicon carbide, and boron carbide.

The alumina-based raw material may be one or more selected from the group consisting of alumina, mullite, alumina-magnesia spinel, zirconia-mullite, and alumina-zirconia.

The zirconia-mullite may be a high-performance zirconia-mullite obtained through a fusion process, wherein the zirconia-mullite comprises crystalline zirconia and mullite as primary components, with the remainder being corundum and/or a matrix glass, and wherein the crystalline zirconia includes a eutectic zirconia crystal having a grain size of 1.0 μm or less, and the matrix glass is contained in an amount of 5 mass % or less. The high-performance zirconia-mullite may be a zirconia-mullite refractory material disclosed, for example, in PCT/JP 2009/051632.

In the present invention, the high-performance zirconia-mullite may be employed when the plate brick is used under conditions requiring higher thermal shock resistance. In this case, the plate brick can have enhanced thermal shock resistance to ensure durability at the same level as that of the conventional impregnated burned product.

The metal other than the aluminum and aluminum alloy may be one or more selected from the group consisting of chromium, chromium alloy, magnesium, iron, nickel and silicon, and may be used in an amount of 0.1 to 10 mass %. Among them, silicon is particularly preferable, because it is highly effective in improving hydration resistance.

The carbon-based raw material may be one or more selected from the group consisting of graphite, pitch and carbon black, and may be used in an amount of 0.1 to 10 mass %. The carbon-based raw material has an effect of improving thermal shock resistance.

One or more of clay, silicon carbide and boron carbide may be used in combination with the aluminum and/or aluminum alloy to allow the plate brick to have improved oxidation resistance and hydration resistance. One or more of clay, silicon carbide and boron carbide may be used in an amount of 0.1 to 10 mass %.

One or more of silicon, clay, silicon carbide and boron carbide may be contained in the refractory raw material mixture in an amount of 0.1 to 15 mass % to further improve the hydration resistance and the oxidation resistance. Specifically, it is more preferable that the refractory raw material mixture comprises 75 to 97 mass % of alumina-based raw material, 0.5 to 20 mass % of aluminum and/or aluminum alloy, and 0.1 to 15 mass % of one or more selected from the group consisting of silicon, clay, silicon carbide and boron carbide.

In order to eliminate the need for an impregnation treatment with a carbon-containing liquid material such as tar or pitch, it is preferable that a particle distribution of the refractory raw material mixture is designed while taking into account densification and strength enhancement by a reaction of aluminum during the heat treatment. This makes it possible to obtain a plate brick having a low porosity and exhibiting strength and thermal shock resistance in a well-balanced manner. More specifically, it is preferable that a fraction having a particle size of 1 mm to 3 mm, a fraction having a particle size of 100 µm to less than 1 mm, a fraction having a particle size of 10 µm to less than 100 µm, and a fraction having a particle size of less than 10 µm, are contained in an amount of 15 to 45 mass %, in an amount of 20 to 40 mass %, in an amount of 10 to 30 mass %, and in an amount of 10 to 30 mass %, respectively. If the rate of the coarse particle fraction having a particle size of 1 mm to 3 mm is less than 15 mass %, an elastic modulus will be increased to cause a tendency of the thermal shock resistance to deteriorate. If the rate is greater than 45 mass %, a microstructure of an obtained plate brick becomes excessively porous to cause a tendency of the durability to deteriorate. If the rate of the intermediate particle fraction having a particle size of 100 µm to less than 1 mm is less than 20 mass %, the thermal shock resistance has a tendency to deteriorate. If the rate is greater than 40 mass %, a microstructure of an obtained plate brick becomes excessively porous to cause a tendency of the strength and corrosion/erosion resistance to deteriorate. If the rate of the fine particle fraction having a particle size of 10 µm to less than 100 µm is less than 10 mass %, a microstructure of an obtained plate brick becomes excessively porous to cause a tendency of the strength and corrosion/erosion resistance to deteriorate. If the rate is greater than 30 mass %, the thermal shock resistance has a tendency to deteriorate. If the rate of the ultrafine particle fraction having a particle size of less than 10 µm is less than 10 mass %, a microstructure of an obtained plate brick becomes excessively porous to cause a tendency of the strength to deteriorate. If the rate is greater than 30 mass %, a microstructure of an obtained plate brick becomes excessively dense to cause a tendency of the thermal shock resistance to deteriorate.

In the present invention, an organic binder is added to the above refractory raw material mixture, and the mixture with the organic binder is kneaded. Then, the kneaded mixture is formed into a given shape by friction press or oil hydraulic press, and the shaped body is subjected to a heat treatment.

The organic binder to be added to the refractory raw material mixture may be one or more of various resins commonly used as a binder for refractory materials, such as a phenol resin, a furan resin and a silicon (silicone) resin. The organic binder may be used after it is diluted with a solvent such as ethylene glycol to adjust a viscosity thereof.

Among the above organic binders, it is preferable to use a phenol resin and a silicon (silicone) resin in combination. This makes it possible to drastically improve the hydration resistance of the plate brick produced through a heat treatment at a temperature of 400 to 1000° C. Heretofore, it has been known that a silicon (silicone) resin is excellent in oxidation resistance and strength. The present invention is based on new knowledge that a silicon (silicone) resin has a significantly excellent effect of improving hydration resistance of a plate brick produced by using aluminum and/or aluminum alloy and through a heat treatment at a temperature of 400 to 1000° C. Thus, quality deterioration due to hydration will never occur even if an impregnation treatment with tar or pitch as in the conventional plate brick is omitted.

Preferably, the heat treatment is performed under a condition that an object to be heat-treated (a shaped body for a plate brick) is sealed from ambient air, for example, under a condition that the object is enclosed in a container, or under a condition that the container is filled with coke particles or an internal space of the container is kept in a nitrogen gas atmosphere, i.e., in a non-oxidizing atmosphere. This makes it possible to prevent oxidation during the heat treatment to obtain a denser and higher-strength plate brick.

In the present invention, the heat treatment can be performed under conditions allowing a ratio of a content rate of aluminum in the plate brick after the heat treatment to a content rate of aluminum in the refractory raw material mixture to fall within the range of 20 to 60%.

In order to determine the conditions for the heat treatment, a test is carried out several times in an intended heat-treating furnace while changing heat treatment conditions at a temperature of 400 to 1000° C., and a content rate of aluminum in a plate brick after the heat treatment is quantitatively analyzed. Then, heat treatment conditions, such as a heat-treating furnace, a heat treatment temperature, a holding time, a muffle configuration and a temperature rise rate, which allow a ratio of a content rate of aluminum in the plate brick after the heat treatment to a content rate of aluminum in the refractory raw material mixture to fall within the range of 20 to 60%, are determined. The term "heat treatment temperature" here means a temperature to be measured so as to control a temperature of the heat-treating furnace. In cases where the heat treatment temperature is measured outside a container under the condition that an object is enclosed in the container as mentioned above, the heat treatment temperature is likely to become different from a temperature of the object. Once the heat treatment conditions are determined, the heat treatment can be performed under the determined conditions without subsequently measuring an amount of aluminum in each heat treatment.

The content rate of aluminum in the refractory raw material mixture can be derived from a calculation based on a mixed rate of aluminum. In cases where an aluminum alloy is used, the content rate of aluminum in the refractory raw material mixture can also be derived from a calculation based on a content rate of aluminum in the aluminum alloy. In the present invention, the term "refractory raw material mixture" means a refractory raw material mixture without containing a binder, and a liquid such as a solvent or water.

The content rate of aluminum in the plate brick after the heat treatment can be derived by a conventional method, such as an ICP method or a wet method.

After the heat treatment, the object is used as a plate brick without being impregnated with a carbon-containing liquid material such as tar or pitch.

EXAMPLES

An organic binder was added to each of a plurality of types of refractory raw material mixtures illustrated in Tables 1 to 3. Then, the mixture with the organic binder was kneaded, and the kneaded mixture was formed into a given shape of a plate brick, by friction press. The shaped body was dried and then subjected to a heat treatment at each temperature in Tables 1 to 3. A size of the plate brick was set to be about 500 mm in length, about 200 mm in width, and about 40 mm in thickness.

The heat treatment was performed by putting the shaped body into a container, filling the container with coke particles, and then setting the container in a heat-treating furnace (electric furnace). A temperature rise rate was set to 50° C./h, and then each heat treatment temperature in Tables 1 to 3 was held for 7 hours. After elapse of the holding time, heating was stopped. When an internal temperature of the furnace was reduced to 400° C. or less, the closed container was taken out of the furnace. Then, when the container was cooled to a handleable temperature, the heat-treated body (plate brick) was taken out of the container. The heat treatment temperature was controlled by a thermocouple installed in an upper portion of the closed container.

A test sample was cut from the plate brick after the heat treatment to measure an apparent porosity and a compressive strength according to respective ones of a method of JIS-R 2205 and a method of JIS-R 2206. A gas generation amount was measured at a heat treatment temperature of 1000° C., according to the standard test method of the JACT and using a PGD-type meter produced by George Fischer, Inc. In this regard, the test sample was dried at 110° C. for 24 hours, in advance of the measurement of the gas generation amount. As for smoke and odor, a test was carried out in a job site. Specifically, when a maintenance operation of a 70-ton ladle was performed in the job side just after a first cycle of casting, smoke and odor generated from a plate brick of a sliding nozzle for the ladle were observed by human senses. In Tables 1 to 3, a plate brick having smoke or odor is denoted by "x", and a plate brick having almost no smoke and no odor is denoted by "○". A hydration test was performed in the following manner. A sample having a length of 20 mm, a width of 20 mm and a height of 20 mm was prepared. After drying the sample at 110° C. for 24 hours, a weight W1 of the dried sample was measured. The dried sample was put into a beaker, and the beaker was covered by a watch glass to prevent water droplets from entering into the sample. Then, the beaker was placed in an autoclave. The beaker was heated, and held at a pressure of 0.3 MPa for 3 hours. Then, after cooling, the sample was taken out of the beaker and dried at 110° C. for 24 hours, and a weight W2 of the dried sample was measured. A weight-increasing rate (%) was calculated by the following formula: $100 \times (W2-W1)/W1$.

A content rate of aluminum in the refractory raw material mixture was derived from a calculation based on a mixed rate of aluminum and/or aluminum alloy, and a content rate of aluminum in the plate brick after the heat treatment was quantitatively determined by an ICP method. In Tables 1 to 3, aluminum as a refractory raw material is comprised of 100 mass % of Al component, and aluminum-magnesium alloy as a refractory raw material is comprised of 50 mass % of Al component and 50 mass % of Mg component.

The plate brick after the heat treatment was stored in a room at a humidity of 90% and at a temperature of 30° C., for 20 days, and then subjected to a practical test. A set of five plate bricks were used in a molten steel ladle, and, from the fifth charge, a damage state in each of the plate bricks was visually checked before use to determine whether the plate brick is usable. Tables 1 to 3 show an average number of usable cycles of the five plate bricks.

Inventive Examples 1 to 4 and Comparative examples 1 to 7 illustrated in Table 1 are plate bricks produced at different heat treatment temperatures. As the heat treatment temperature becomes higher, the compressive strength tends to be much more improved, and the apparent porosity tends to become higher. Each of the Inventive Examples 1 to 4 is a plate brick produced at a heat treatment temperature of 650° C., 700° C. or 750° C., to have a compressive strength of 180 MPa or more and a weight-increasing rate as measured in the hydration test of 1% or less, which fall within the scope of the present invention. Further, a ratio of a content rate of aluminum in the plate brick after the heat treatment to a content rate of aluminum in the refractory raw material mixture is in the range of 20 to 60%, which falls within the scope of the present invention. The Inventive Examples 1 to 4 are excellent in durability as evidenced by the fact that the number of usable cycles in the practical test is 8 or 9. As compared with the Inventive Example 2, the Inventive Example 3 is different only in that a combination of a phenol resin and a silicon (silicone) resin is used as the organic resin. As seen in Table 1, the Inventive Example 3 is excellent in hydration resistance, and increased in denseness and strength. Further, the usable life (the number of usable cycles) is increased by one.

In contrast, in the Comparative Example 4 where the heat treatment temperature is set to 600° C., the compressive strength is lowered to 169 MPa, and the number of usable cycles is reduced to 6. Moreover, the ratio of a content rate of aluminum in the plate brick after the heat treatment to a content rate of aluminum in the refractory raw material mixture is largely increased to 68%. It would be considered that, in the Comparative Example 4, the melting and reaction of aluminum become insufficient due to the relatively low heat treatment temperature, and thereby sufficient strength could not be obtained. The Comparative Examples 2 and 3 where the heat treatment temperature is set to 450° C. and 550° C., have the same tendency.

In the Comparative Example 5, the heat treatment temperature is set to 850° C., but the weight-increasing rate as measured in the hydration test is 1.1%, which is out of the scope of the present invention. In the Comparative Example 5, the ratio of a content rate of aluminum in the plate brick after the heat treatment to a content rate of aluminum in the refractory raw material mixture is reduced to 16%. Thus, it would be considered that aluminum carbide is excessively formed. Moreover, in the Comparative Example 5, the durability in the practical test deteriorates. This means that an excessively small amount of the residual aluminum causes a tendency of the durability to deteriorate. The Comparative Example 6 where the heat treatment temperature is set to 1000° C. has the same tendency.

The Comparative Example 1 is a conventional unburned product, and the Comparative Example 7 is a conventional burned product impregnated with tar after burning. In the Comparative Examples 1 and 7, the gas generation amount is increased to 20.2 cc/g and 14.7 cc/g, respectively.

Inventive Examples 5 to 7 illustrated in Table 2 are plate bricks using an aluminum-magnesium alloy. As compared with a plate brick using only aluminum, each of the Inventive Examples 5 to 7 has sufficient strength and superior hydration resistance even if the heat treatment temperature is relatively low. Further, the ratio of a content rate of aluminum in the plate brick after the heat treatment to a content rate of aluminum in the refractory raw material mixture falls within the scope of the present invention, and excellent durability is exhibited.

Inventive Example 8 is a plate brick using a refractory raw material mixture comprising alumina-magnesia spinal mixed as the alumina-based raw material. The Inventive Example 8 also exhibits sufficient durability.

Inventive Examples 9 to 12 are plate bricks produced while changing the mixed amount of the aluminum and the particle distribution of the refractory raw material mixture. When the content rate of aluminum after the heat treatment becomes equal to or greater than 5 mass %, the durability (the number of usable cycles) becomes deteriorated as compared with the example where it is less than 5 mass %. However, the durability falls within a level causing no practical problem.

Inventive Examples 15 and 16 illustrated in Table 3 are plate bricks using a high-performance zirconia-mullite (zirconia-mullite B) where a eutectic zirconia crystal has a grain size of 1.0 μm or less, and a matrix glass is contained in an amount of 5 mass % or less. As compared with Inventive Examples 13 and 14 using conventional zirconia-mullite (zirconia-mullite A), the Inventive Examples 15 and 16 are superior in the durability in the practical test. The zirconia-mullite A used in the Inventive Examples 13 and 14 comprises, as chemical components, 44 mass % of $Al_2O_3$, 37 mass % of $ZrO_2$ and 18 mass % of $SiO_2$, wherein a matrix glass is contained in an amount of 0.9 mass %, and a eutectic zirconia crystal has a grain size of 2.5 μm. The high-performance zirconia-mullite (zirconia-mullite B) used in the Inventive Examples 15 and 16 comprises, as chemical components, 44 mass % of $Al_2O_3$, 37 mass % of $ZrO_2$ and 18 mass % of $SiO_2$, wherein a matrix glass is contained in an amount of 0.9 mass %, and a eutectic zirconia crystal has a grain size of 0.2 μm.

Comparative Example 9 is a plate brick using a refractory raw material mixture devoid of silicon, clay, silicon carbide and boron carbide. As seen in Table 3, the Comparative Example 9 is high in the weight-increasing rate as measured in the hydration test, and inferior in the hydration resistance to Inventive example 17 containing silicon and using a combination of a phenol resin and a silicon (silicone) resin as the organic binder, Table 1

Table 2

Table 3

TABLE 1

| | | Comparative Example 1 | Comparative Example 2 | Comparative Example 3 | Comparative Example 4 | Inventive Example 1 | Inventive Example 2 | Inventive Example 3 |
|---|---|---|---|---|---|---|---|---|
| Refractory raw material mixture (mass %) | alumina | 87 | 87 | 87 | 87 | 87 | 87 | 87 |
| | aluminum | 5 | 5 | 5 | 5 | 5 | 5 | 5 |
| | aluminum-magnesium alloy | | | | | | | |
| | silicon | 2 | 2 | 2 | 2 | 2 | 2 | 2 |
| | clay | 2 | 2 | 2 | 2 | 2 | 2 | 2 |
| | silicon carbide | 2 | 2 | 2 | 2 | 2 | 2 | 2 |
| | boron carbide | 1 | 1 | 1 | 1 | 1 | 1 | 1 |
| | graphite | 1 | 1 | 1 | 1 | 1 | 1 | 1 |
| Organic binder *1 (mass %) | phenol resin | 2 | 2 | 2 | 2 | 2 | 4 | 2 |
| | silicon (silicone) resin | 2 | 2 | 2 | 2 | 2 | | 2 |
| Particle distribution of refractory raw material mixture (mass %) | from 1 mm to 3 mm | 30 | 30 | 30 | 30 | 30 | 30 | 30 |
| | from 100 μm to less than 1 mm | 30 | 30 | 30 | 30 | 30 | 30 | 30 |
| | from 10 μm to less than 100 μm | 20 | 20 | 20 | 20 | 20 | 20 | 20 |
| | less than 10 μm | 20 | 20 | 20 | 20 | 20 | 20 | 20 |
| Change in aluminum | aluminum after heat treatment (mass % | 4.8 | 4.1 | 3.8 | 3.4 | 3.0 | 1.9 | 1.6 |
| | ratio of content rate of aluminum after heat treatment to content rate of aluminum in refractory raw material mixture | 96 | 82 | 76 | 68 | 60 | 38 | 32 |
| Heat treatment conditions | heat treatment temperature (° C.) | 200 | 450 | 550 | 600 | 650 | 700 | 700 |
| Impregnation treatment | tar impregnation | non-impregnated | non-impregnated | non-impregnated | non-impregnated | non-impregnated | non-impregnated | non-impregnated |
| Test result | apparent porosity (%) | 2.5 | 3.2 | 3.7 | 4.1 | 4.8 | 6.7 | 4.4 |
| | compressive strength (MPa) | 145 | 155 | 166 | 169 | 200 | 230 | 257 |
| | gas generation amount (cc/g) | 20.2 | 8.0 | 7.7 | 7.5 | 7.2 | 6.8 | 6.6 |
| | weight-increasing rate as measured in hydration test | 0.1 | 0.3 | 0.3 | 0.4 | 0.4 | 0.8 | 0.5 |
| | smoke and odor | X | ○ | ○ | ○ | ○ | ○ | ○ |
| | number of usable cycles in practical test | 5 | 5 | 5 | 6 | 8 | 8 | 9 |

TABLE 1-continued

|  |  | Inventive Example 4 | Comparative Example 5 | Comparative Example 6 | Comparative Example 7 |
|---|---|---|---|---|---|
| Refractory raw material mixture (mass %) | alumina | 87 | 87 | 87 | 87 |
|  | aluminum | 5 | 5 | 5 | 5 |
|  | aluminum-magnesium alloy |  |  |  |  |
|  | silicon | 2 | 2 | 2 | 2 |
|  | clay | 2 | 2 | 2 | 2 |
|  | silicon carbide | 2 | 2 | 2 | 2 |
|  | boron carbide | 1 | 1 | 1 | 1 |
|  | graphite | 1 | 1 | 1 | 1 |
| Organic binder *1 (mass %) | phenol resin | 2 | 2 | 2 | 2 |
|  | silicon (silicone) resin | 2 | 2 | 2 | 2 |
| Particle distribution of refractory raw material mixture (mass %) | from 1 mm to 3 mm | 30 | 30 | 30 | 30 |
|  | from 100 μm to less than 1 mm | 30 | 30 | 30 | 30 |
|  | from 10 μm to less than 100 μm | 20 | 20 | 20 | 20 |
|  | less than 10 μm | 20 | 20 | 20 | 20 |
| Change in aluminum | aluminum after heat treatment (mass %) | 1.0 | 0.8 | 0.1 | 0.0 |
|  | ratio of content rate of aluminum after heat treatment to content rate of aluminum in refractory raw material mixture | 20 | 16 | 2 | 0 |
| Heat treatment conditions | heat treatment temperature (° C.) | 750 | 850 | 1000 | 1200 |
| Impregnation treatment | tar impregnation | non-impregnated | non-impregnated | non-impregnated | impregnated |
| Test result | apparent porosity (%) | 7.1 | 11.1 | 12.5 | 6.7 |
|  | compressive strength (MPa) | 259 | 244 | 218 | 237 |
|  | gas generation amount (cc/g) | 5.6 | 4.5 | 2.8 | 14.7 |
|  | weight-increasing rate as measured in hydration test | 0.7 | 1.1 | 1.3 | 0.5 |
|  | smoke and odor | ○ | ○ | ○ | X |
|  | number of usable cycles in practical test | 8 | 6 | 6 | 8 |

*1: mass % to be added to 100 mass % of refractory raw material mixture

TABLE 2

|  |  | Inventive Example 5 | Inventive Example 6 | Inventive Example 7 | Inventive Example 8 | Inventive Example 9 | Inventive Example 10 | Inventive Example 11 | Inventive Example 12 |
|---|---|---|---|---|---|---|---|---|---|
| Refractory raw material mixture (mass %) | alumina | 87 | 87 | 87 | 57 | 91 | 82 | 77 | 72 |
|  | spinel |  |  |  | 30 |  |  |  |  |
|  | aluminum |  |  |  | 5 | 1 | 10 | 15 | 20 |
|  | aluminum-magnesium alloy | 5 | 5 | 5 |  |  |  |  |  |
|  | silicon | 2 | 2 | 2 | 2 | 2 | 2 | 2 | 2 |
|  | clay | 2 | 2 | 2 | 2 | 2 | 2 | 2 | 2 |
|  | silicon carbide | 2 | 2 | 2 | 2 | 2 | 2 | 2 | 2 |
|  | boron carbide | 1 | 1 | 1 | 1 | 1 | 1 | 1 | 1 |
|  | graphite | 1 | 1 | 1 | 1 | 1 | 1 | 1 | 1 |
| Organic binder *1 (mass %) | phenol resin | 4 | 4 | 4 | 4 | 2 | 2 | 2 | 2 |
|  | silicon (silicone) resin |  |  |  |  | 2 | 2 | 2 | 2 |
| Particle distribution of refractory raw material mixture (mass %) | from 1 mm to 3 mm | 30 | 30 | 30 | 30 | 35 | 15 | 25 | 45 |
|  | from 100 μm to less than 1 mm | 30 | 30 | 30 | 30 | 25 | 40 | 35 | 20 |
|  | from 10 μm to less than 100 μm | 20 | 20 | 20 | 20 | 10 | 20 | 30 | 15 |
|  | less than 10 μm | 20 | 20 | 20 | 20 | 30 | 25 | 10 | 20 |
| Change in aluminum | aluminum after heat treatment (mass %) | 1.5 | 1.2 | 0.6 | 2.4 | 0.5 | 5 | 7 | 9 |
|  | ratio of content rate of aluminum after heat treatment to content rate of aluminum in refractory raw material mixture | 60 | 48 | 24 | 48 | 50 | 50 | 47 | 45 |
| Heat treatment conditions | heat treatment temperature (° C.) | 500 | 600 | 700 | 800 | 700 | 700 | 700 | 700 |
| Impregnation treatment | tar impregnation | non-impregnated | non-impregnated | non-impregnated | non-impregnated | non-impregnated | non-impregnated | non-impregnated | non-impregnated |
| Test result | apparent porosity (%) | 3.5 | 4.1 | 4.6 | 8.0 | 5.1 | 3.2 | 3.5 | 2.9 |
|  | compressive strength (MPa) | 220 | 265 | 286 | 223 | 257 | 275 | 285 | 291 |
|  | gas generation amount (cc/g) | 8 | 7.7 | 7.5 | 5.5 | 6.8 | 6.5 | 6.7 | 6.8 |
|  | weight-increasing rate as measured in hydration test | 0.4 | 0.6 | 0.6 | 0.9 | 0.3 | 0.8 | 0.8 | 1.0 |
|  | smoke and odor | ○ | ○ | ○ | ○ | ○ | ○ | ○ | ○ |

TABLE 2-continued

|  |  | Inventive Example 5 | Inventive Example 6 | Inventive Example 7 | Inventive Example 8 | Inventive Example 9 | Inventive Example 10 | Inventive Example 11 | Inventive Example 12 |
|---|---|---|---|---|---|---|---|---|---|
|  | number of usable cycles in practical test | 8 | 8 | 8 | 8 | 8 | 7 | 7 | 7 |

*1: mass % to be added to 100 mass % of refractory raw material mixture

TABLE 3

|  |  | Inventive Example 13 | Inventive Example 14 | Inventive Example 15 | Inventive Example 16 | Inventive Example 17 | Comparative Example 9 |
|---|---|---|---|---|---|---|---|
| Refractory raw material mixture (mass %) | alumina | 67 | 47 | 67 | 47 | 72 | 74 |
|  | zirconia-mullite A | 20 | 40 |  |  | 20 | 20 |
|  | zirconia-mullite B |  |  | 20 | 40 |  |  |
|  | aluminum | 5 | 5 | 5 | 5 | 5 | 5 |
|  | silicon | 2 | 2 | 2 | 2 | 2 |  |
|  | clay | 2 | 2 | 2 | 2 |  |  |
|  | silicon carbide | 2 | 2 | 2 | 2 |  |  |
|  | boron carbide | 1 | 1 | 1 | 1 |  |  |
|  | graphite | 1 | 1 | 1 | 1 | 1 | 1 |
| Organic binder *1 (mass %) | phenol resin | 2 | 2 | 2 | 2 | 2 | 4 |
|  | silicon (silicone) resin | 2 | 2 | 2 | 2 | 2 |  |
| Particle distribution of refractory raw material mixture (mass %) | from 1 mm to 3 mm | 30 | 30 | 30 | 30 | 30 | 30 |
|  | from 100 μm to less than 1 mm | 30 | 30 | 30 | 30 | 30 | 30 |
|  | from 10 μm to less than 100 μm | 20 | 20 | 20 | 20 | 20 | 20 |
|  | less than 10 μm | 20 | 20 | 20 | 20 | 20 | 20 |
| Change in aluminum | aluminum after heat treatment (mass % | 2.4 | 1.8 | 2 | 1.3 | 2.4 | 2.4 |
|  | ratio of content rate of aluminum after heat treatment to content rate of aluminum in refractory raw material mixture | 48 | 36 | 40 | 26 | 48 | 48 |
| Heat treatment conditions | heat treatment temperature (° C.) | 700 | 700 | 700 | 700 | 700 | 700 |
| Impregnation treatment | tar impregnation | non-impregnated | non-impregnated | non-impregnated | non-impregnated | non-impregnated | non-impregnated |
| Test result | apparent porosity (%) | 5.1 | 4.8 | 4.3 | 4 | 3.9 | 3.6 |
|  | compressive strength (MPa) | 261 | 272 | 274 | 278 | 222 | 217 |
|  | gas generation amount (cc/g) | 5.5 | 6.8 | 6.5 | 6.7 | 5.5 | 5.5 |
|  | weight-increasing rate as measured in hydration test | 0.4 | 0.4 | 0.5 | 0.6 | 0.9 | 1.5 |
|  | smoke and odor | ○ | ○ | ○ | ○ | ○ | ○ |
|  | number of usable cycles in practical test | 8 | 8 | 9 | 9 | 7 | 6 |

* 1: mass % to be added to 100 mass % of refractory raw material mixture

What is claimed is:

1. A plate brick comprising:
a shaped body including an organic binder and a refractory raw material mixture containing 0.5 to 20 mass % of aluminum and/or aluminum alloy, and the shaped body is subjected to a heat treatment at a temperature of 500 to 800° C.,
wherein a ratio of a content rate of aluminum in the plate brick after heat treatment to a content rate of aluminum in the refractory raw material mixture before heat treatment is within the range of 20 to 60%,
wherein the plate brick is obtained without being impregnated with a carbon-containing liquid material comprising tar or pitch, after the heat treatment, and
wherein the plate brick has a compressive strength of 180 MPa or more, a weight-increasing rate of 1% or less as measured in a hydration test using an autoclave.

2. The plate brick as defined in claim 1, wherein the temperature for the heat treatment is in the range of 500 to 750° C.

3. The plate brick as defined in claim 1, wherein the organic binder comprises a combination of a phenol resin and a silicon (silicone) resin.

4. The plate brick as defined in claim 3, which contains aluminum in an amount of 0.5 to 3.5 mass %.

5. The plate brick as defined in claim 4, which generates gas in an amount of 0.5 to 8 cc/1 g as measured at 1000° C., and has an apparent porosity of 2 to 10%.

6. A method of producing the plate brick as defined in claim 1, the method comprising: adding the organic binder to the refractory raw material mixture containing 75 to 97 mass % of alumina-based raw material, 0.5 to 20 mass % of aluminum and/or aluminum alloy, and 0.1 to 15 mass % of one or more selected from the group consisting of silicon, clay, silicon carbide and boron carbide; kneading the mixture with the organic binder; forming the kneaded mixture into a shaped body; and subjecting the shaped body to a heat treatment.

7. The method as defined in claim 6, wherein the refractory raw material mixture contains, as the alumina-based raw material, 10 to 40 mass % of high-performance zirconia-mullite obtained through a fusion process, the zirconia-mullite comprising crystalline zirconia and mullite as primary components, with the remainder being corundum and/or a matrix glass, and wherein the crystalline zirconia includes a eutectic zirconia crystal having a grain size of 1.0 μm or less, and the matrix glass is contained in an amount of 5 mass % or less.

8. The plate brick as defined in claim 2, wherein the organic binder comprises a combination of a phenol resin and a silicon (silicone) resin.

9. The plate brick as defined in claim 8, which contains aluminum in an amount of 0.5 to 3.5 mass %.

10. The plate brick as defined in claim 9, which generates gas in an amount of 0.5 to 8 cc/1 g as measured at 1000° C., and has an apparent porosity of 2 to 10%.

11. A plate brick comprising:
a heat treated body including
an organic binder, and
a refractory material mixture comprising 75 to 97 mass % of alumina-based raw material and 0.5 to 20 mass % of aluminum and/or aluminum alloy,
wherein the heat treatment of the body occurs at a temperature of 500 to 800° C., a ratio of a content rate of aluminum in the plate brick after heat treatment to a content rate of aluminum in the refractory material mixture before heat treatment is within the range of 20 to 60%,
wherein the plate brick is obtained without being impregnated with a carbon-containing liquid material comprising tar or pitch, after the heat treatment, and
wherein the plate brick has a compressive strength of 180 MPa or more, an apparent porosity of 2 to 10%, and generates gas in an amount of 0.5 to 8 cc/1 g as measured at 1000° C.

12. The plate brick as defined in claim 11, wherein the heat treatment of the body occurs at a temperature in the range of 500 to 750° C.

13. The plate brick as defined in claim 11, wherein the organic binder comprises a combination of a phenol resin and a silicon (silicone) resin.

14. The plate brick as defined in claim 13, which contains aluminum in an amount of 0.5 to 3.5 mass %.

15. The plate brick as defined in claim 12, wherein the organic binder comprises a combination of a phenol resin and a silicon (silicone) resin.

16. The plate brick as defined in claim 15, which contains aluminum in an amount of 0.5 to 3.5 mass %.

17. The plate brick as defined in claim 11, wherein the mass % of aluminum after heat treatment is 1 to 3 mass %.

18. The plate brick as defined in claim 11, wherein the apparent porosity is 4 to 8%.

19. The plate brick as defined in claim 1, wherein the compressive strength is at least 200 MPa.

20. The plate brick as defined in claim 11, wherein the refractory raw material mixture contains 5 to 20 mass % of aluminum and/or aluminum alloy.

\* \* \* \* \*